United States Patent
Kim et al.

(10) Patent No.: US 8,825,216 B2
(45) Date of Patent: Sep. 2, 2014

(54) APPARATUS FOR CONTROLLING POWER OF SENSOR NODES BASED ON ESTIMATION OF POWER ACQUISITION AND METHOD THEREOF

(75) Inventors: Bong Wan Kim, Daejeon (KR); No Seong Park, Daejeon (KR); Sung Soo Kang, Daejeon (KR); Jae Gak Hwang, Daejeon (KR)

(73) Assignees: Electronics and Telecommunications Research Institute, Daejeon (KR); Donga One Corporation, Seoul (KR)

( * ) Notice: Subject to any disclaimer, the term of this patent is extended or adjusted under 35 U.S.C. 154(b) by 436 days.

(21) Appl. No.: 13/332,020

(22) Filed: Dec. 20, 2011

(65) Prior Publication Data
US 2012/0165963 A1     Jun. 28, 2012

(30) Foreign Application Priority Data
Dec. 23, 2010    (KR) ........................ 10-2010-0134059

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G06F 19/00 | (2011.01) |
| G01R 21/00 | (2006.01) |
| G01R 21/06 | (2006.01) |
| G01R 31/36 | (2006.01) |
| G01R 19/00 | (2006.01) |
| G08C 19/16 | (2006.01) |
| H01M 10/44 | (2006.01) |
| H01M 10/46 | (2006.01) |

(52) U.S. Cl.
USPC ............... 700/291; 700/22; 700/297; 702/61; 702/63; 702/64; 340/870.01; 320/101

(58) Field of Classification Search
CPC ........ Y02B 60/50; G01S 7/003; G06Q 50/06; Y04S 10/54; H04Q 2209/86; H04Q 2009/886; F24F 11/001; F24F 2011/0075; F21S 9/03; G05B 2219/2639; G08C 17/02
USPC ........ 700/11, 22, 286, 291, 297, 298; 702/57, 702/60–65, 127, 189; 340/870.01, 870.07; 713/300, 320, 340; 320/101
See application file for complete search history.

(56) References Cited

U.S. PATENT DOCUMENTS

| | | |
|---|---|---|
| 7,564,810 B2 | 7/2009 | Hernandez et al. |
| 8,264,401 B1 * | 9/2012 | Kavaler ........................ 342/128 |

(Continued)

FOREIGN PATENT DOCUMENTS

| | | | |
|---|---|---|---|
| JP | 2002135977 A | * | 5/2002 |
| JP | 2009137340 A | * | 6/2009 |

*Primary Examiner* — Crystal J Barnes-Bullock (57) ABSTRACT

An apparatus for controlling power of sensor nodes based on estimation of power acquisition, includes: a self power acquisition unit acquiring self power; an internal sensing unit sensing power acquired from the self power acquisition unit and consumed power; a power cut-off unit cutting-off power for each component of the sensor nodes; and a microprocessor receiving information of acquired power and consumed power from the internal sensing unit to analyze a supply and demand of power, estimating the acquired power using annual meteorological statistics data and recent weather forecast data, controlling power for each component of the sensor nodes through the power cut-off unit according to the estimation of the acquired power, and controlling a sensing period and a communication period of the sensor nodes.

10 Claims, 4 Drawing Sheets

(56) References Cited

U.S. PATENT DOCUMENTS

| | | | |
|---|---|---|---|
| 2007/0050240 A1* | 3/2007 | Belani et al. | 705/13 |
| 2008/0077336 A1* | 3/2008 | Fernandes | 702/57 |
| 2010/0025483 A1* | 2/2010 | Hoeynck et al. | 236/1 C |
| 2010/0262312 A1* | 10/2010 | Kubota et al. | 700/295 |
| 2011/0055036 A1* | 3/2011 | Helfan | 705/26.1 |
| 2011/0087379 A1* | 4/2011 | Savelle et al. | 700/284 |
| 2011/0172837 A1* | 7/2011 | Forbes, Jr. | 700/291 |
| 2012/0123981 A1* | 5/2012 | Graves et al. | 706/13 |
| 2012/0143383 A1* | 6/2012 | Cooperrider et al. | 700/295 |
| 2013/0030583 A1* | 1/2013 | Owen | 700/291 |

* cited by examiner

APPARATUS FOR CONTROLLING POWER OF SENSOR NODES BASED ON ESTIMATION OF POWER ACQUISITION AND METHOD THEREOF

CROSS-REFERENCES TO RELATED APPLICATIONS

The present application claims priority under 35 U.S.C 119(a) to Korean Application No. 10-2010-0134059, filed on Dec. 23, 2010, in the Korean Intellectual Property Office, which is incorporated herein by reference in its entirety set forth in full.

BACKGROUND

Exemplary embodiments relate to sensor nodes of a sensor network, and more particularly, to an apparatus and a method for controlling power of sensor nodes based on estimation of power acquisition capable of controlling power at a multi step according to a supply and demand of power of a self power acquisition apparatus, during an operation of the sensor nodes.

Generally, a sensor network is a technology of collecting sensing information from sensor nodes installed in various environments.

The sensor nodes of the sensor network are operated by being supplied with power through a self power acquisition apparatus, such as a solar cell, and so on. Therefore, there has been focused on operating the sensor nodes at low power.

In case of a wireless sensor node, a communication pattern mainly serves to transmit the sensed information and thus, traffic is relatively small.

Therefore, an idle time of a communication interface module is maximally long by using the above-mentioned characteristic, thereby reducing power consumption in such a manner that the power consumption of the communication interface module is reduced as maximally as possible.

However, the above-mentioned low power implementation is a simple manner since only the communication module among several components of the sensor nodes saves power. Therefore, in order to more save power, a need exists for a method for saving power consumption of all the components of the sensor nodes.

In particular, the sensor nodes need to transmit the information collected from the sensors over a long period of time, when considering the characteristics of the sensor nodes. Therefore, the sensor nodes may largely need the self power acquisition apparatus using new renewable energy, such as sunlight.

In this case, the variation of the acquired power is large due to external factors, such as weather, and so on. However, the related art controls power only by reducing the power consumption of the sensor nodes, such that the related art does not provide a method for appropriately controlling power in the case of the sensor nodes in which the acquired power is substantially varied.

The above technology configuration is a background art for helping understanding of the present invention but does not mean the related art well-known in the art to which the present invention pertains.

SUMMARY

An object of the present invention is to provide an apparatus and a method for controlling power of sensor nodes based on estimation of power acquisition capable of controlling power of the sensor nodes at a multi step according to a supply and demand of power by estimating self power acquisition and analyzing power consumption for each component, during an operation the sensor nodes.

An embodiment of the present invention relates to an apparatus for controlling power of sensor nodes based on estimation of power acquisition, including: a self power acquisition unit acquiring self power; an internal sensing unit sensing power acquired from the self power acquisition unit and consumed power; a power cut-off unit cutting-off power for each component of the sensor nodes; and a microprocessor receiving acquired power and consumed power from the internal sensing unit to analyze a supply and demand of power, estimating the acquired power using annual meteorological statistics data and recent weather forecast data, controlling power for each component of the sensor nodes through the power cut-off unit according to the estimation of the acquired power, and controlling a sensing period and a communication period of the sensor nodes.

In one embodiment, the microprocessor may include: an internal sensor information analysis module receiving the acquired power and the consumed power from the internal sensing unit in real time to analyze the supply and demand of power; an acquisition power estimation module estimating the acquired power using the supply and demand of power transferred from the internal sensor information analysis module and the annual meteorological statistics data and the recent weather forecast data stored in a database (DB); a multi-step power setting module setting multi-step power control steps based on the estimation of the acquired power calculated from the acquisition power estimation module; a hardware power control module performing a power control of each hardware chip within the sensor nodes according to the power control steps set in the multi-step power setting module; a communication period control module controlling a communication period according to the power control steps set in the multi-state power setting module; and a sensing period control module controlling a sensing period of the sensors according to the power control steps set in the multi-state power setting module.

In one embodiment, the apparatus for controlling power of sensor nodes based on estimation of power acquisition may further include: an annual meteorological statistics DB receiving and storing annual meteorological statistics data of an area in which the sensor nodes are installed from external weather information sites; and a recent weather forecast data DB receiving and storing recent weather forecast data from the external weather information sites.

The self power acquisition unit may include: a solar panel acquiring self power; and a charging circuit and a rechargeable battery storing solar energy acquired from the solar panel.

The internal sensing unit may include: a voltage sensor measuring output voltage from the solar panel and output voltage from the rechargeable battery; a current sensor measuring output current from the solar panel and output current from the battery; a position information sensor detecting current positions, date, and time of the sensor nodes; a solar radiation sensor measuring solar radiation at positions at which the sensor nodes are installed; and a temperature sensor measuring temperature in a system within the sensor nodes.

The power cut-off unit may include a plurality of relay devices and semiconductor switching devices cutting-off power for each component of the sensor nodes according to the control of the microprocessor.

Another embodiment of the present invention relates to a method for controlling power of sensor nodes based on estimation of power acquisition, including: performing initial operations of each device and sensors within the sensor nodes when power is applied to the sensor nodes; performing a power consumption analysis operation for each device and each sensor within the sensor nodes; analyzing a supply and demand of power by receiving the result of the power consumption analysis operation and information of acquired power and consumed power, and estimating the acquired power using annual meteorological statistics data and recent weather forecast data; and performing a power control on each device of the sensor nodes according to the estimation of the acquired power and a current charging state and controlling a sensing period and a communication period of the sensor nodes.

In another embodiment, the performing of the power control of each device of the sensor nodes and the controlling of the sensing period and the communication period may include: determining whether the estimation of the acquired power and the current charging state satisfy currently set power control steps; if it is determined that the estimation of the acquired power and the current charging state do not satisfy currently set power control steps, controlling the current set power control steps step-up or step-down and if it is determined that the estimation of the acquired power and the current charging state satisfy currently set power control steps, performing the power control for each device and for each step, and controlling the communication period and the sensing period to meet the currently set power control step; and waiting till next power control step control time.

In another embodiment, the power control step may be set with a multi-step power control mode for controlling power for each component of the sensor nodes at a multi step according to the currently charging state and the acquisition power estimation result.

In another embodiment, the power control step may include: a first step in which if a current charging state is a full charging state and power acquisition estimation is good, normal communication is performed and a normal sensor operation is performed; a second step in which if the current charging state is a full charging state and the power acquisition estimation is normal, low power communication is performed and a normal sensor operation is performed; a third step in which if the current charging state is low and the power acquisition estimation is normal, low power communication is performed and the sensing period is controlled; a fourth step in which if the current charging state is a threshold or less and the power acquisition estimation is poor, ultra-low power communication is performed and the sensing period is increased; a fifth step in which if a current charging state is near the lowest value and the power acquisition estimation is poor, communication stops and the sensing period is increased; and a sixth step in which if the current charging step is the lowest value or less and the power acquisition estimation is poor, communication and sensing stop and enter a sleep state.

As set forth above, the embodiments of the present invention can increase the life time of the sensor nodes and stably operate the sensor network, by controlling the power of the sensor nodes at a multi step according to the supply and demand of power by estimating the self power acquisition and analyzing the power consumption for each component, during the operation the sensor nodes.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

In describing the embodiment, a thickness of lines illustrated in the drawings, a size of components, etc., may be exaggeratedly illustrated for clearness and convenience of explanation. In addition, terms described to be below are terms defined in consideration of functions in the present invention, which may be changed according to the intention or practice of a user or an operator. Therefore, these terms will be defined based on contents throughout the specification.

Recently, technologies of using new renewable energy, such as sunlight, wind power, tidal power, and so on, have been in the limelight due to depletion of fossil energy. Since a node system such as sensor nodes installed in the open air needs to be operated over a long period of time in a condition that it is difficult to supply AC power, it is necessary a power acquisition from the new renewable energy.

In terms of characteristics of the new renewable energy, the acquired power is different for each season, month, day, and time and is greatly affected by weather and climate and thus, variation of power production is large. Therefore, the node system needs a control method for reducing overall power, in consideration of the variation of power production.

Figure 1:
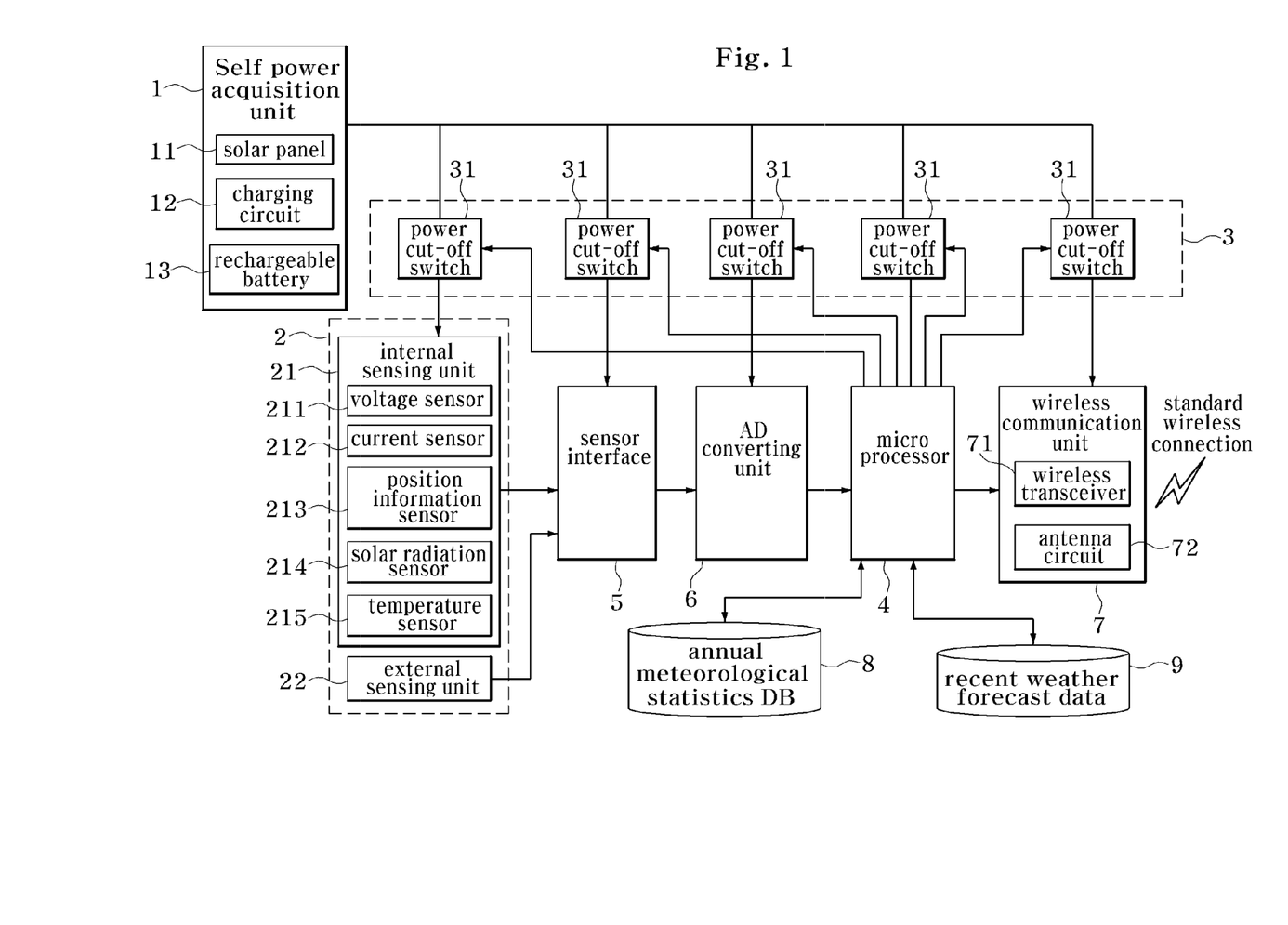
FIG. 1 is a diagram explaining a configuration of an apparatus for controlling power of sensor nodes based on estimation of power acquisition according to an embodiment of the present invention.

FIG. 1 is a diagram for explaining a configuration of an apparatus for controlling power of sensor nodes based on estimation of power acquisition according to an embodiment of the present invention.

Referring to FIG. 1, an apparatus for controlling power of sensor nodes based on estimation of power acquisition according to an embodiment of the present invention includes a self power acquisition unit 1, a sensing unit 2, a power cut-off unit 3, and a microprocessor 4.

The self power acquisition unit 1 is a power acquisition apparatus using the new renewable energy, such as sunlight, wind power, tidal power, and so on. A case of acquiring power using sunlight will be described in the embodiment of the present invention. The self power acquisition unit 1 includes a solar panel 11 for acquiring self power and a charging circuit 12 and a rechargeable battery 13 for storing solar energy.

The sensing unit 2 includes an internal sensing unit 21 that is installed in the sensor nodes to monitor the sensor nodes and an external sensing unit 22 that is installed outside the cases of the sensor nodes to collect information.

The internal sensing unit 21 includes a voltage sensor 211, a current sensor 212, a position information sensor 213, a solar radiation sensor 214, and a temperature sensor 215.

The voltage sensor 211 measures output voltage from the solar panel 11 and output voltage from the rechargeable battery 13. The current sensor 212 measures output current from the solar panel 11 and output current from the rechargeable battery 13. The power produced from the solar panel 11 and the power consumed through the rechargeable battery 13 may be detected in real time through values measured from the voltage sensor 211 and the current sensor 212.

The position information sensor 213 may be used to detect current positions, date, and time so as to estimate the acquired power. When the position information sensor 213 is absent, the acquired power may be detected by previously inputted information on positions at which the sensor nodes are installed.

The solar radiation sensor 214 may be used to determine whether the acquired power is appropriate by comparing with the measured solar radiation. As a result, the solar radiation sensor 214 may be used to determine how much power production is disrupted when the solar panel 11 is covered from sun by snow, rain, dust, yellow dust, leaves, and so on. When the solar radiation sensor 214 is absent, the solar radiation may be detected using weather information on an area in which the sensor nodes are installed from external weather information sites.

The temperature sensor 215 may be used to detect the internal temperature of the system so as to determine whether the system is stable.

In addition, in order to separately analyze power consumed by sensors connected to the inside and the outside of the cases, the current sensor 212 measuring current output to a sensor interface 5 may be added.

Further, the apparatus for controlling power of sensor nodes includes the sensor interface 5 for connecting with the sensor and an AD converting unit 6 for an analog sensor according to a type of the sensor, that is, an analog-digital conversion circuit.

In addition, a wireless communication unit 7 for wireless communication is included based on the microprocessor 4. The wireless communication unit 7 includes a wireless transceiver 71 and an antenna circuit 72.

The power cut-off unit 3 is used to cut-off power of the sensing unit 2, the sensor interface 5, the AD converting unit 6, and the wireless communication unit 7, so as to control power at a multi step. The power cut-off unit 3 is configured of relay devices or is configured of semiconductor switching devices consuming lower power.

The microprocessor 4 and the wireless communication unit 7 that consume a large amount of power may be converted into a sleep mode that barely consumes power through an external pin or an inner circuit. This is used in a multi-step power control program according to the embodiment of the present invention. Generally, the microprocessor 4 of the sensor node itself provides the sleep mode and provides the external pin for the sleep mode of the wireless communication unit 7 or implements the sleep mode by adding the power cut-off switch 31.

An annual meteorological statistics DB 8 receives annual meteorological statistics data of an area in which the sensor nodes are installed from external weather information sites and stores the received annual meteorological statistics data in a database. In the case of using the solar energy, intensity of illumination and solar radiation data and an accumulated solar radiation data that is a sum thereof are important. In the case of the wind energy, wind direction, wind speed, in particular, wind quality indicating whether wind constantly blows so as to be appropriate for wind power generation are important. The meteorological statistics data are stored in the DB, wherein daily meteorological data in which statistics in recent years are accumulated are highest in terms of availability but monthly meteorological data are used in the case of an area in which there are no daily meteorological data.

When the annual meteorological statistics DB reflects the approximate change in acquired power, a recent weather forecast data DB 9 can more accurately estimate power acquisition by including recent weather forecast information therewith. In particular, a short term weather forecast is important. Since the solar radiation is suddenly reduced on a cloudy day or a rainy day, the annual meteorological statistics DB receives and stores the weather forecast data so as to reflect the estimation of the acquired power.

Figure 2:
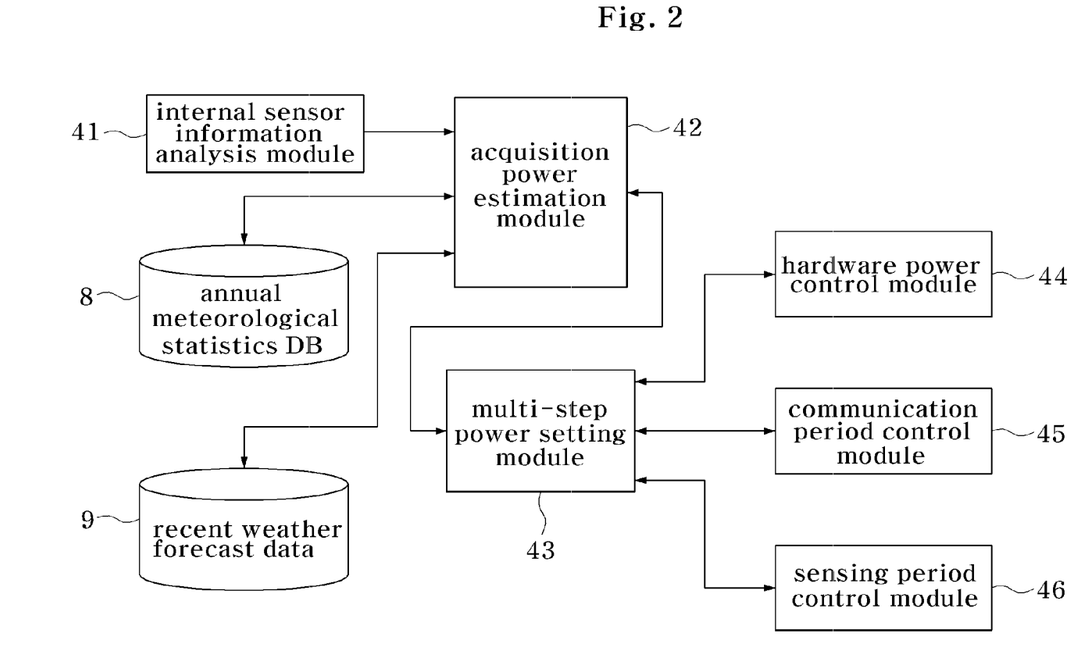
FIG. 2 is a diagram explaining a module configuration of a microprocessor for controlling power of sensor nodes according to an embodiment of the present invention.

FIG. 2 is a diagram explaining a module configuration of a microprocessor for controlling power of sensor nodes according to an embodiment of the present invention.

Referring to FIG. 2, the microprocessor 4 includes an internal sensor information analysis module 41, an acquisition power estimation module 42, a multi-step power setting module 43, a hardware power control module 44, a communication period control module 45, and a sensing period control module 46.

The internal sensor information analysis module 41 receives information of power acquired from the solar panel 11 through the voltage sensor 211 and the current sensor 212 and information of power consumption supplied to the sensor nodes through the rechargeable battery 13 in real time to analyze the supply and demand of power. The analysis results are transferred to the acquisition power estimation module 42 so as to be used for estimation of power. In addition, when the position information sensor 213 is present, the position information sensor 213 transfers the information to the annual meteorological statistics DB 8 and the recent weather forecast DB 9 so as to receive the meteorological statistics and information on positions at which the current sensor nodes are installed. When the solar radiation sensor 214 is present, the solar radiation sensor 214 reports, as abnormal conditions, the case in which it is determined that the acquired power is continuously insufficient as a result of comparing the solar radiation with the acquired power so as to take measures.

The acquisition power estimation module 42 estimates the acquired power using acquisition power real-time information transferred from the internal sensor information analysis module 41 and the weather information transferred through the annual meteorological statistics DB 8 and the recent weather forecast data DB 9. The calculated acquisition power estimation information and real-time acquisition and the power consumption information are transferred to the multi-step power setting module 43.

Figure 3:
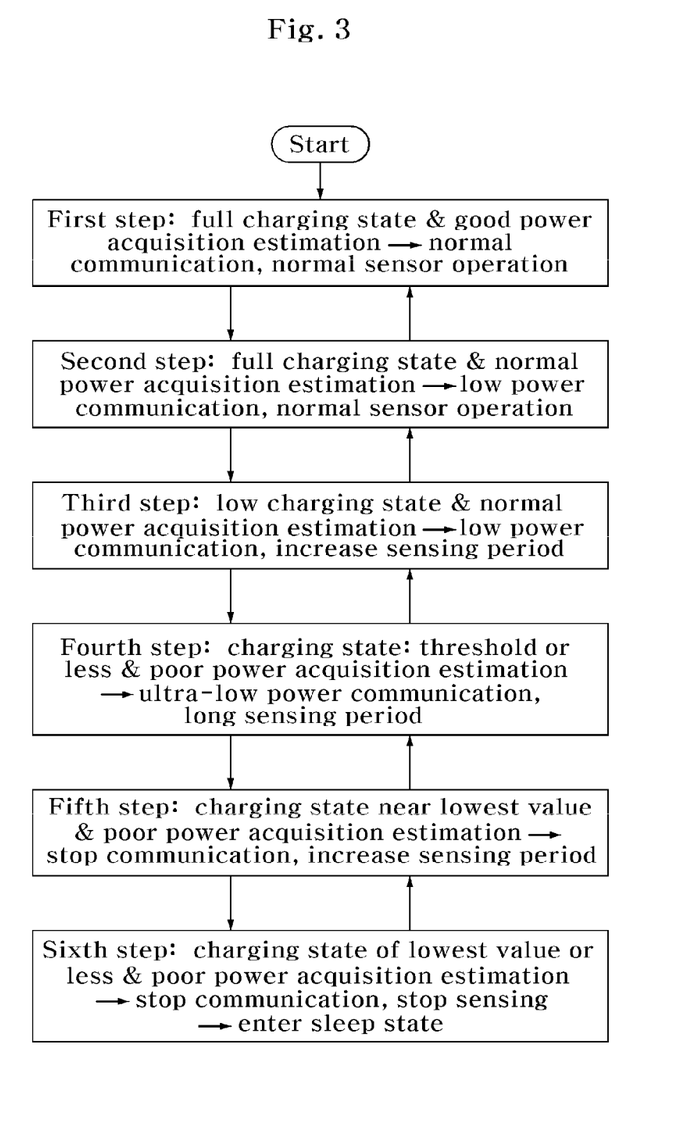
FIG. 3 is an exemplified diagram controlling power of sensor nodes at a multi step according to an embodiment of the present invention.

The multi-step power setting module 43 sets power control steps, based on the acquisition power estimation information and real-time acquisition and the power consumption information that are transferred from the acquisition power estimation module. FIG. 3 illustrates an example of the power control steps.

The hardware power control module 44 performs the power control of each hardware chip within the sensor nodes according to the power control steps set in the multi-step power setting module 43. The control information is transferred to the power cut-off switch 31 to turn-on/off each device chip for each power control step.

The communication period control module 45 controls a communication period according to the power control steps set in the multi-step power setting module 43 when there is a need to control the communication period. When the supply of power is good, the communication period is reduced so as to frequently perform the communication, if necessary. On the other hand, when the supply of power is not good, the communication period is increased so as to collect and transmit data to be transmitted as maximally as possible, thereby reducing the power consumption.

The sensing period control module 46 controls the sensing period according to the power control steps set in the multi-step power setting module when there is a need to control the sensing period of the sensors. When the supply of power is good, the sensing period is reduced so as to frequently perform the sensing, if necessary. On the other hand, when the supply of power is not good, the sensing period is increased to reduce the power consumption.

FIG. 3 is an exemplified diagram controlling power of sensor nodes at a multi step according to an embodiment of the present invention.

Referring to FIG. 3, the setting of the power control steps determines the current charging state of the rechargeable battery by integrating the total power kept by the current sensor nodes and the power acquisition estimation. Step 1 is set to be a state in which the current power state and the power acquisition estimation are best and step 6 is set to be a state in which the current power state and the power acquisition estimation are worst. The setting of the steps is one example. In the actual implementation, more steps may be set, or fewer steps may be set. The exemplified determination conditions of each step and the method for controlling power for each step are as follows.

Step 1: Full Charging State, and Good Power Acquisition Estimation

Step 1 is a state in which the rechargeable battery 13 is fully charged and thus, the power charge in the rechargeable battery 13 is a peak and the power acquisition estimation is also good and thus, the supply of power is best. Therefore, both of the communication and the sensing are normally operated.

Step 2: Full Charging State, and Normal Power Acquisition Estimation

Step 2 is a state in which the rechargeable battery 13 is fully charged and thus, the power charge in the rechargeable battery 13 is a peak but the power acquisition estimation is normal. Therefore, the sensor is normally operated but the wireless communication unit 7 is operated in the sleep mode through the low power communication when there are no transmission data so as to implement low power. The microprocessor 4 is also in the sleep mode state while there is no sensing or communication, thereby reducing the power consumption.

Step 3: Low Charging State and Normal Power Acquisition Estimation

Step 3 is a state in which the charging state of the rechargeable battery 13 is reduced and the power acquisition estimation is normal. Therefore, the power consumption is reduced by controlling the sensing period of the sensor, together with the low power communication. When the sensing is not performed, power supplied to the sensors is cut-off except for initial warming up and sensing time. The microprocessor 4 is also in the sleep mode state while there is no sensing or communication, thereby reducing the power consumption.

Step 4: Charging State of Threshold or Less, and Poor Power Acquisition Estimation Step 4 is a state in which the charging state is a threshold or less and the power acquisition estimation is poor. Therefore, the communication period is increased to perform ultra-low power communication and the sensing period of the sensors is increased to largely reduce the power consumption. The sleep mode time of the microprocessor is also increased so as to further reduce the power consumption. The threshold is an arbitrarily defined value and is defined as a value appropriate for the setting of the step through an experiment.

Step 5: Charging State Near Lowest Value and Poor Power Acquisition Estimation

Step 5 is a state in which the charging state is near the lowest value and the power acquisition estimation is poor, such that only the minimum power can be used. The communication is not conducted until the supply of power is good and only the sensing period is increased so as to store the sensing value in the internal memory. The stored sensing value is transferred to a server through an upper node or a gateway by resuming the communication when the supply of power is good.

Step 6: Charging State of Lowest Value or Less, and Poor Power Acquisition Estimation Step 6 is a state in which the charging state falls to the lowest value or less and the power acquisition estimation is also poor. Step 6 is a state in which the supply of power is worst and thus, the communication and the sensing of the sensors are impossible. Before power is completely exhausted, they are previously entered in the sleep state until the supply of power is good. Therefore, they stop the operation of all the hardwares except time logics, including the microprocessor 4 and reserve the release of the sleep state through the timer after predetermined time lapses. After the predetermined time lapses, they temporarily wake from the sleep state by the timer to check the state of the supply of power. If they can enter the upper step since the supply of power is good, they proceed to the upper step to perform the procedure of the upper step. If they are still in step 6, they again set a next timer and re-enter the sleep state.

Figure 4:
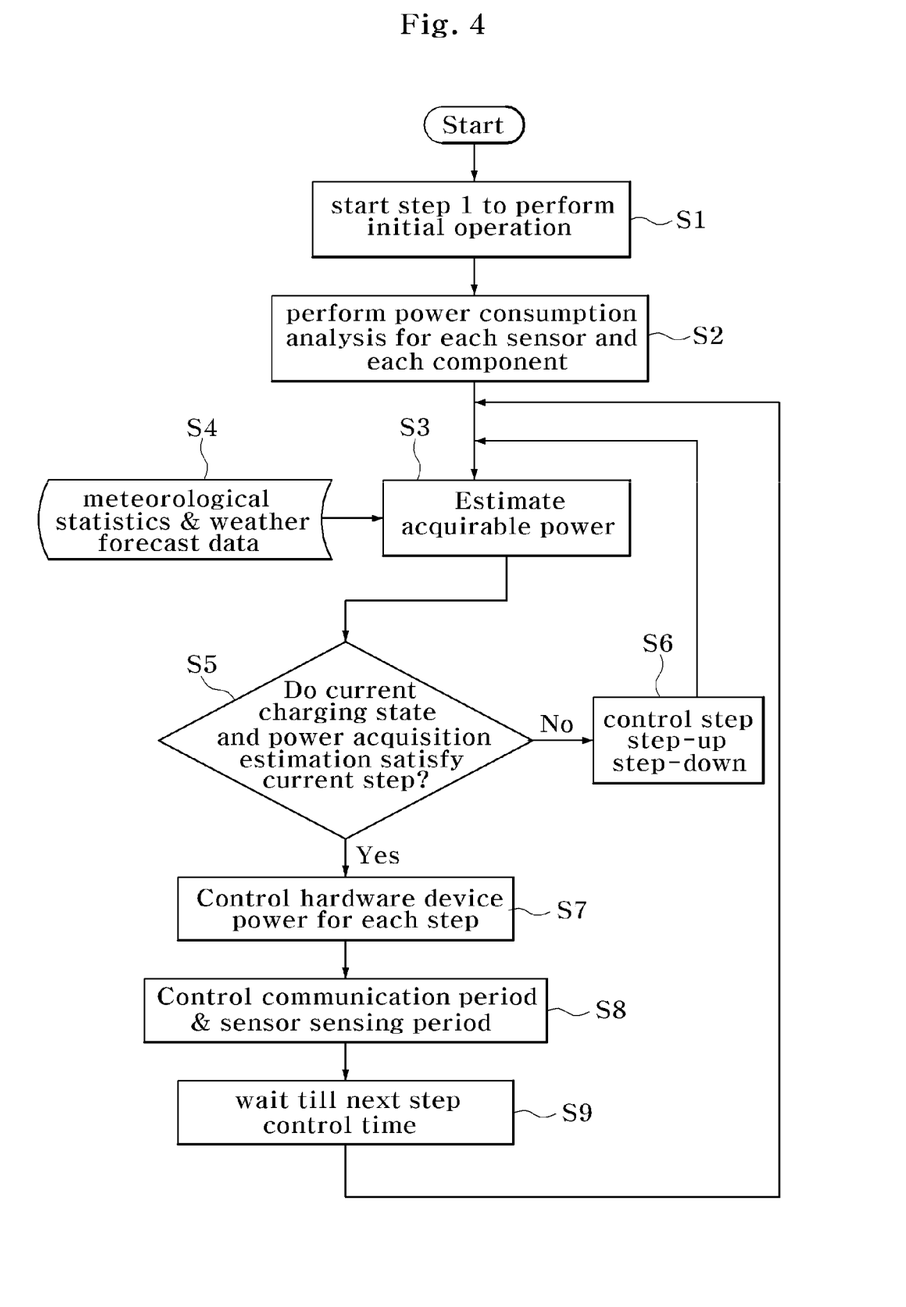
FIG. 4 is a flow chart explaining a method for controlling power of sensor nodes based on estimation of power acquisition according to an embodiment of the present invention.

FIG. 4 is a flow chart explaining a method for controlling power of sensor nodes based on estimation of power acquisition according to an embodiment of the present invention.

Referring to FIG. 4, when power is first applied to the sensor nodes, step 1 of power control starts once in the state in which power is fully charged to perform the initial operations of each device and the sensors within the sensor nodes (S1).

Then, as one of the initial operations, the power consumption analysis operation for each sensor and for each device within the sensor nodes is performed (S2). Through the analysis, an energy saving effect is digitized at the time of cutting-off power for each sensor. The same analysis is performed on each device within the sensor nodes to digitize the energy saving effect at the time of cutting-off power.

Then, the acquirable power is estimated by the acquisition power estimation module 42 (S3).

In this case, the acquisition power estimation module 42 estimates the acquired power using the acquisition power real-time information transferred from the internal sensor information analysis module 41 and the weather information transferred through the annual meteorological statistics DB 8 and the recent weather forecast data DB 9 (S4).

Then, the method for controlling power determines whether the currently set power control step is satisfied by integrating the current charging state and the power acquisition estimation (S5).

In this case, if it is determined that the currently set power control step is not satisfied, the power control step is controlled step-up or step-down (S6). After the control ends, the process proceeds to S3.

If it is determined that the currently set power control step is satisfied, the power control of the hardware devices for each step is performed (S7).

Then, the communication period is controlled to meet the current power control step (S8) and the sensing period of the sensors is also controlled (S9).

Next, after the power control according to the current power control step ends, the process waits till the next step control time. When the waiting time lapses, the process proceeds to S3 to again repeat the step setting process of the power control (S9).

The method for controlling power of sensor nodes periodically controls the power control step by the process according to the flow chart of the multi-step power control to implement the multi-step power control based on the estimation of the current retention power and the future acquirable power.

As set forth above, the embodiments of the present invention can increase the life time of the sensor nodes and stably operate the sensor network, by controlling the power of the sensor nodes at a multi step according to the supply and demand of power by estimating the self power acquisition and analyzing the power consumption for each component, during the operation of the sensor nodes.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. An apparatus for controlling power of sensor nodes based on estimation of power acquisition, comprising:
   a self power acquisition unit acquiring self power;
   an internal sensing unit sensing power acquired from the self power acquisition unit and consumed power;
   a power cut-off unit cutting-off power for each component of the sensor nodes; and
   a microprocessor receiving information of acquired power and consumed power from the internal sensing unit to analyze a supply and demand of power, estimating the acquired power using annual meteorological statistics data and recent weather forecast data, controlling power for each component of the sensor nodes through the power cut-off unit according to the estimation of the acquired power, and controlling a sensing period and a communication period of the sensor nodes.

2. The apparatus of claim 1, wherein the microprocessor includes:
   an internal sensor information analysis module receiving information of the acquired power and the consumed power from the internal sensing unit in real time to analyze the supply and demand of power;
   an acquisition power estimation module estimating the acquired power using the supply and demand of power transferred from the internal sensor information analysis module and the annual meteorological statistics data and the recent weather forecast data stored in a database;
   a multi-step power setting module setting multi-step power control steps based on the estimation of the acquired power calculated from the acquisition power estimation module;
   a hardware power control module performing a power control of each hardware chip within the sensor nodes according to the power control steps set in the multi-step power setting module;
   a communication period control module controlling a communication period according to the power control steps set in the multi-state power setting module; and
   a sensing period control module controlling a sensing period of the sensors according to the power control steps set in the multi-state power setting module.

3. The apparatus of claim 1, further comprising:
   an annual meteorological statistics DB receiving and storing annual meteorological statistics data of an area in which the sensor nodes are installed from external weather information sites; and
   a recent weather forecast data DB receiving and storing recent weather forecast data from the external weather information sites.

4. The apparatus of claim 1, wherein the self power acquisition unit includes:
   a solar panel acquiring self power; and
   a charging circuit and a rechargeable battery storing solar energy acquired from the solar panel.

5. The apparatus of claim 4, wherein the internal sensing unit includes:
   a voltage sensor measuring output voltage from the solar panel and output voltage from the rechargeable battery;
   a current sensor measuring output current from the solar panel and output current from the rechargeable battery;
   a position information sensor detecting current positions, date, and time of the sensor nodes;
   a solar radiation sensor measuring solar radiation at positions at which the sensor nodes are installed; and
   a temperature sensor measuring temperature in a system within the sensor nodes.

6. The apparatus of claim 1, wherein the power cut-off unit includes a plurality of relay devices and semiconductor switching devices cutting-off power for each component of the sensor nodes according to the control of the microprocessor.

7. A method for controlling power of sensor nodes based on estimation of power acquisition, comprising:
   performing initial operations of each device and sensors within the sensor nodes when power is applied to the sensor nodes;
   performing a power consumption analysis operation for each device and each sensor within the sensor nodes;
   analyzing a supply and demand of power by receiving the result of the power consumption analysis operation and information of acquired power and consumed power, and estimating the acquired power using annual meteorological statistics data and recent weather forecast data; and
   performing a power control on each device of the sensor nodes according to the estimation of the acquired power and a current charging state and controlling a sensing period and a communication period of the sensor nodes.

8. The method of claim 7, wherein the performing of the power control of each device of the sensor nodes and the controlling of the sensing period and the communication period include:
   determining whether the estimation of the acquired power and the current charging state satisfy currently set power control steps;
   if it is determined that the estimation of the acquired power and the current charging state do not satisfy currently set power control steps, controlling the current set power control steps step-up or step-down and if it is determined that the estimation of the acquired power and the current charging state satisfy currently set power control steps, performs the power control for each device and for each step, and controlling the communication period and the sensing period to meet the currently set power control step; and
   waiting till next power control step control time.

9. The method of claim 8, wherein the power control step is set with a multi-step power control mode for controlling power for each component of the sensor nodes at a multi step according to the currently charging state and the acquisition power estimation result.

10. The method of claim 8, wherein the power control step includes:
- a first step in which if a current charging state is a full charging state and power acquisition estimation is good, normal communication is performed and a normal sensor operation is performed;
- a second step in which if the current charging state is a full charging state and the power acquisition estimation is normal, low power communication is performed and a normal sensor operation is performed;
- a third step in which if the current charging state is low and the power acquisition estimation is normal, low power communication is performed and the sensing period is controlled;
- a fourth step in which if the current charging state is a threshold or less, and the power acquisition estimation is poor, ultra-low power communication is performed and the sensing period is increased;
- a fifth step in which if a current charging state is near the lowest value and the power acquisition estimation is poor, communication stops and the sensing period is increased; and
- a sixth step in which if the current charging step is the lowest value or less, and the power acquisition estimation is poor, communication and sensing stop and enter a sleep state.

* * * * *